United States Patent
Miller et al.

[11] Patent Number: 6,067,288
[45] Date of Patent: May 23, 2000

[54] PERFORMANCE MONITORING DELAY MODULES

[75] Inventors: Daniel L. Miller, Dallas; Scott J. Haney, Allen; Christopher J. Ouellette, McKinney, all of Tex.

[73] Assignee: Alcatel USA Sourcing, L.P., Plano, Tex.

[21] Appl. No.: 09/001,316

[22] Filed: Dec. 31, 1997

[51] Int. Cl.[7] .................................................. H04L 12/28

[52] U.S. Cl. ...................... 370/242; 359/110; 370/252; 370/248

[58] Field of Search ................................ 370/242, 250, 370/522, 907, 244, 248; 714/42, 43, 712

[56] References Cited

U.S. PATENT DOCUMENTS

5,913,036  6/1999  Brownmiller et al. ............ 395/200.54

*Primary Examiner*—Joseph L. Felber
*Attorney, Agent, or Firm*—Baker Botts L.L.P.

[57] ABSTRACT

A method is disclosed for processing PM signals to be optionally applied to an accumulator PM data module for further analysis including the steps of monitoring first and second transmission line channels to detect events, generating first and second PM signals in response to the events, receiving the first and second PM signals in first and second delay modules, the first and second delay modules having first and second module values therein, and optionally applying, responsive to the second PM signal, the first module values to the accumulator PM data module so as to acquire PM data for collection, storage and analysis.

7 Claims, 9 Drawing Sheets

PERFORMANCE MONITORING DELAY MODULES

This invention relates to telecommunications systems and more particularly to a performance monitoring system and method for use on telecommunications systems.

BACKGROUND OF INVENTION

Telecommunication equipment is generally divided into two main categories. One category is the telecommunication switch. The traditional switch routes numbers dialed to a particular circuit which, in turn, is routed to another circuit, continuing in an iterative process. Each stage, to some degree, constitutes a switch. Variations on the switch include the POTS (plain old telephone service) system and newer technology systems such as ATM (asynchronous transfer mode) which dynamically determines on which circuit to route the calls.

The other category of telecommunication equipment is transmission equipment. This includes high bandwidth copper wire or fiberoptic cable intended to transmit data over a long distance or to directly interface with other transmission equipment without additional switching. For example, in the U.S. and Canada, modern transmission equipment generally transmits at STS1, OC3, OC12 and OC48 speeds. Older transmission equipment transmits at DS1 and DS3 speeds. The connections of transmission equipment are not dynamic, but rather are provisioned as fixed ahead of time such as the connections between (or within) telephone companies. In modem telecommunication systems, software is used to establish these permanent connections between two geographical points.

The present invention can be applied to any of these systems including other connectionless networks such as local area networks (LANs) or the Internet, as well as to cable technology.

For most telecommunications equipment that have interfaces, such as switches, the interfaces are composed of copper wires and/or fiberoptic cables. The physical wires or cables (lines) can be defective, suffering from problems such as environmentally induced noise, hardware malfunction or complete severing. Furthermore, the traffic (the one or more paths carried within the line) being transmitted may be defective with respect to bandwidth. For example, problems can occur on a line which carried a particular problematic path which was itself multiplexed together with other paths from their respective lines to form the aggregated traffic contents of a higher bandwidth line.

Performance Monitoring (or Performance Management) ("PM") provides quality assurance to telecommunication system operators by allowing a piece of telecommunications equipment to assess its own health and the health of the traffic that is flowing into and out of it. PM is accomplished by monitoring and measuring certain kinds of quantitative operational data which reveal the quality of the paths and lines. This operational data can generate "PM data" which can be monitored by employees located at the switch or can be transmitted to a central hub of network operations where other employees oversee the entire network. PM data permits an operator, whether in a central office or worldwide, to diagnose a failure as it occurs or predict the onset of failures (nonfatal increases in the occurrence of a problem over a period of time) and execute steps toward preventative or remedial maintenance of the equipment. Sources of PM data include dedicated hardware application cards located at points of entry of traffic across the copper wire of fiberoptic cable and UNIX processes executed as part of the telecommunications process.

There are approximately 200 identical instances of PM data, including severely errored seconds, defects that have actually occurred, number of failed tests, laser temperature measurement or consumption of pools of resources. The occurrence of any of these instances detected by monitoring operational data creates an event. An event is a defect, failure or anomaly in transmission which causes the occurrence of a severely erred second or a spontaneous condition. The problems could be hardware (e.g., for POTS) where PM data is focused or software (e.g., for new technology switches) where traffic metering and monitoring (TMM) data is focused. While there are several differences between PM data and TMM data, for the purposes of the present invention, PM data is meant to also encompass TMM data unless stated otherwise.

Because modem telecommunications systems exist in multi-vendor and/or multi-product environments, a telecommunications software system must be designed to operate in such an environment. Consequently, PM system activities and requirements are highly standardized due to the required compatibility between diverse products. Standards organizations such as the International Telecommunication Unit (ITU), the American National Standards Institute (ANSI) and Bell Communications Research (BELCORE) set forth standards which incorporate PM.

PM data is acquired by using several types of functionality. The vast majority of the PM data is acquired by an accumulator function. An accumulator function's value varies unidirectionally. For example, an additive accumulator function begins with a value of zero and is incremented or increased by a value (including zero) at each instance of an event. Conventionally, at each change of value, the accumulator function checks for whether the value has crossed a threshold, after which certain actions may be taken, including the emission of a threshold crossing alert (TCA). A minority of the PM data is acquired by a gauge function. A gauge function's value varies bidirectionally. The value fluctuates straight up and down depending on what is being measured on the transmission line. For example, gauge functions can reflect a laser temperature meter for measuring the power output of a fiberoptic cable. When the value of a meter becomes too high ("too hot"), an overload problem of some kind may be occurring. When the value becomes too low ("too cold"), there may not be enough power to drive the signal through the cable over the distances required. In either case, when a gauge function's value moves outside of the tolerable range, an onset threshold is crossed. When the value of the gauge function returns to the tolerable range, an abatement threshold is crossed. Thus, onset signifies entering some state. Abatement signifies crossing a threshold that returns the value to a previous state. The gauge function inherently checks for these threshold crossings.

These and other PM data acquiring functions are packaged together, conventionally, as one product-dependent software system by PM designers. Furthermore, PM data collection and storage functionality is also bundled into the conventional PM system package. While this satisfies the necessity for custom-tailored solutions, it results in much time and expense in designing, writing and debugging PM software products.

One of the standards for fiberoptic telecommunications is synchronous optical network (SONET). The SONET PM standards (GR-253-CORE SONET Transport Systems: Common Criteria) describe a set of state machines. One of the requirements of the SONET specification, with regard to the accumulator function, is that a network element support performance monitoring which permits the discarding of PM data accumulated in a ten second window of a monitoring interval ("the discard standard").

There are two approaches which satisfy the discard standard. One is more complex and harder to achieve than the other. The first easier approach actually permits "fudging" or falling short of discarding the unwanted data by clearing certain registers and counts. In essence, the requirement is not fulfilled in this option. It follows that the majority of PM software systems implement the less complex, easier to achieve standard approach. However, this approach results in PM software systems that are less accurate than systems that achieve the higher standard.

The second, more complex approach is dictated by state machines in SONET that imply an undo operation. There are basically two ways of implementing an undo operation. One method incorporates maintaining the previous state for a period of time as an open transaction and, at some point, closing the transaction. During the period from the transaction's opening to the transaction's closing, the system can discard the new state data and roll back to the previous state. The second method incorporates the theory of providing an inverse operation for every operation. For example, for each increment function, a decrement fimction can be provided and for each TCA emission, a TCA revocation can be provided.

Either method places a significant burden on the PM designer. The first, transaction-oriented approach would be very unusual and bulky to incorporate into a PM application due to its complex software, slow performance, high RAM storage consumption, high CPU consumption, and overall design complexity. To function correctly, the second inverse operation method implies a cascading wave front of inverse operations rippling through the telecommunication equipment and/or to computer systems outside the telecommunication equipment. This design complexity requires excessive coordination between personnel and systems. Thus, there is a need for a method of more efficiently implementing the more accurate, more complex standard approach.

PM data, after it is acquired during a monitoring interval, is normally collected for analysis and/or transmission to a remote site. Conventionally, this collection incorporates a remote application demarcation of the monitoring interval. The various PM data functionality is duplicated such that there are disparate current and previous accumulator functions, disparate current and previous gauge functions, etc. The application domain determines which function to collect from. This application responsibility creates complexity in the conventional PM system. Also, multiple bulk transfers which include PM data from different sources of PM data are transmitted in a piecemeal fashion. The methods presently used package subsets of PM data based on its source because the recipient of that data cannot process a mixed package of PM data. Also, most systems do not handle heterogenous mixtures of sizes of integers or categories of PM data or PM data aggregates (e.g., DS1, DS3, OC12). This type of system is wasteful of system resources and tends to be inflexible to the characteristics of PM data.

Performance monitoring data which have been generated at a source of PM data and acquired can be collected and transmitted to various local or remote processors. Generally, two methods of collection have been used in conventional PM systems. The first method used can be termed, the "pull" method. The pull method assumes a system architecture in which there is a central authority processor among multiple processors. The central authority demarcates the performance monitoring intervals by transmitting a signal to all the other processors informing them of the demarcation. The problem with this method of demarcation is that the time it takes to transmit to each one of the processors creates a time drift effect. By the time the last transmission is completed, the demarcation time is considerably different from the time of the first transmission. Even in a multicast demarcation setting, drift occurs due to the multiple layer architecture of the system. Because not all processors can communicate with all other processors, a multicast signal becomes a recursive multicast signal and latencies of each architectural level cause drift. The standards generally allow for only about ten seconds of error or "slop." Often, this time drift, along with the inherent inaccuracies in the time of day clocks, result in substandard system performance (contributing to more than 10 seconds of slop). Furthermore, the central authority processor often suffers from poor performance or slower execution speed due to its burdensome demarcating function. As a result, operators of these systems usually choose to set them to demarcate only a subset of the PM data.

The second method of PM data collection utilized can be termed the "push" method. In this method, the demarcation function is completely delegated to the various processors whose clocks are synchronized. At the point of demarcation, each of these processors package their data and, unaware of any of the others' performing the same operation in unison, dump it to a centralized controller such that a flooding situation occurs. In a real time system, this results in the controller not being able to execute its other activities, such as call processing, while it is processing the flood of data (e.g., for 8 to 10 seconds at a time). The controller may perform sluggishly for up to a minute after the data dump. Thus, the push method actually degrades the performance of a piece of telecommunications equipment when it is intended to monitor and improve its health. Thus, both methods suffer from problems due to their design.

Finally, after collecting PM data for a monitoring interval and transmitting it, if necessary, to a controller, an application must write the data to disk. Therefore, to perform the functions of a PM system, a method of data input/output (I/O) is necessary. Specifically, persistence on disk prevents the loss of data and state information in the event of a power loss or other shut down.

Conventionally, PM designers had three options to choose from in this regard. The first option for PM storage design was using a commercial off-the-shelf database product such as Sybase or Oracle, or even an object-oriented database such as Borland's "Interbase." The problem with using these database products for PM is that their high functionality and many features result in a very slow, sluggish system characterized by low throughput. That is, the writing to disk would be slow. Because PM does not require the extent of functionality supplied by these database products, the cost of lower throughput is not justified.

The second option for PM storage design is to write disk I/O operations from scratch using UNIX files in the application domain without any underlying consistent software. There are several problems with this method. First, it lacks reusability. Every time there is a variation or modification in the telecommunications equipment or system, the designer might need to re-tailor this custom software in multiple places, costing much engineering time. Second, from a maintenance perspective, debugging a system such as this would be difficult due to a lack of consistency in the functionality. Third, this system tends to be sequential. That is, it lacks the ability to access data in a random fashion from multiple threads of execution. Thus, a designer has no ability to deal directly with disk blocks (e.g., flush a single disk block or read one disk block) in an efficient manner. The only control over what data is resident in RAM versus what has been written to disk is through flushing an entire file. Also, a designer could not control concurrent access of multiple threads. In sum, performance cannot be predicted since the operating system controls the disk block layout. Finally, this type of system normally lacks any caching mechanism or control over caching.

The third option for PM storage design is to utilize a non-cached, non-file system in which raw I/O operations are performed to disk. The problem with this option is that it has no caching functionality. The lack of caching means that many more disk operations are necessary. Because disk drives are two to three orders of magnitude slower than the rest of the electronics of a computer, this leads to poor system performance. Thus, none of these options satisfies the needs of a PM system.

Finally, as described hereinabove, in designing a conventional PM system to incorporate the above-described functionality which meets the standards, PM system designers have packaged all of the software's functionality together, including the product-specific functionality and product-independent functionality. These systems are designed to be used on and are highly focused toward particular types of telecommunication equipment.

As a result, these conventional PM systems have not been designed to be flexible. That is, they have always been custom written as a single software program for a particular telecommunication equipment product configuration. No functionality was separated out because functionality boundaries were not recognized. Therefore, a PM designer has had to rewrite the PM code each time it was to be applied to another configuration, type or piece of telecommunication equipment. This is very time-consuming and expensive to implement so that designing, writing and debugging in made easier and less costly.

An object of the invention is to provide a product-independent delay module that satisfies the SONET standard for discarding several seconds of generated PM data under certain prescribed circumstances in a manner which does not slow performance, increase RAM and CPU consumption or create design complexity.

SUMMARY OF THE INVENTION

In accordance with the present invention, a PM delay module is provided which substantially eliminates or reduces disadvantages and problems associated with prior attempts to satisfy the SONET PM standard.

The present invention provides a method for processing PM signals to be optionally applied to an accumulator PM data module for further analysis including the steps of monitoring first and second transmission line channels to detect events, generating first and second PM signals in response to the events, receiving the first and second PM signals in first and second delay modules, the first and second delay modules having first and second module values therein, and optionally applying, responsive to the second PM signal, the first module values to the accumulator PM data module so as to acquire PM data for collection, storage and analysis.

More specifically, the receiving step includes providing the first and second PM signals representative of first and second PM signal values to a first and second delay module queue. Furthermore, the optionally applying step includes the steps of determining a state of the second delay module queue after the second PM signal value is received and optionally applying the first module values to the accumulator PM data module, responsive to the second delay module state. The second delay module can be a controlling delay module and the first delay module is a controlled delay module.

Finally, the determining step can include the step of checking whether the second module values include consecutive "ones" or "zeroes" and the method can further include the step of transitioning the second delay queue out of the discard state when the second module values include consecutive "ones" and the step of transitioning the second delay queue into the discard state when the second module values include consecutive "zeroes."

The present invention, thus, has the technical advantage of providing a product-independent delay module that satisfies the SONET standard in a manner which does not slow performance, increase RAM and CPU consumption or create design complexity.

BRIEF DESCRIPTION OF THE DRAWING

Further objects, features and advantages of the invention will become apparent from the following detailed description taken in conjunction with the accompanying figures in which.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with preferred embodiments. It is intended that changes and modifications can be made to the described embodiments without departing from the true scope and spirit of the subject invention as defined by the appended claims.

DETAILED DESCRIPTION

Figure 1:
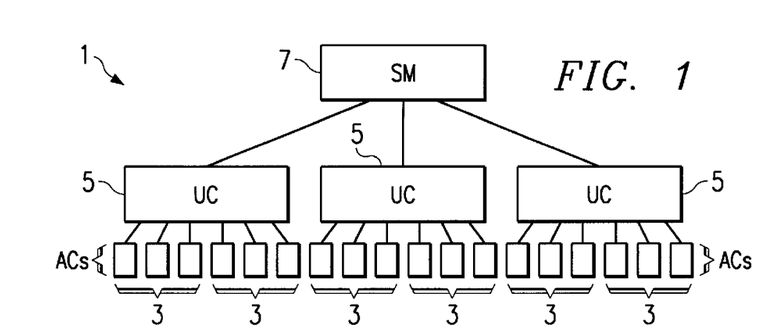
FIG. 1 is a block diagram of a distributed telecommunications system to which the present invention can be applied.

FIG. 1 is a block diagram of a distributed telecommunications system 1. The distributed telecommunication system 1 includes three architectural levels. The first level includes at least one application card (AC) 3 which is located where the copper wire lines or fiberoptic connections are terminated. Each AC 3 is a dedicated hardware point of entry of traffic across the copper wire or fiberoptic cable. While an AC is used to describe the functionality of the present invention, any source of PM data, including UNIX processes executed as part of the telecommunications process, can be substituted for it. The second architectural level of the distributed telecommunications system includes at least one unit controller (UC) 5 having its own CPU controlling (e.g., the shelf of) one or more ACs 3. In FIG. 1, there are six ACs 3 to each of the three UCs 5. Finally, the third level includes a system manager (SM) 7 which is a computer for overseeing the operation of the UCs 5 and overseeing the operation of multiple shelves. While this three level architecture is used to describe the present invention, one skilled in the art would understand that the present invention can be implemented in any level architecture, including a single-tiered system as long as there are address space boundaries.

Reusable PM Tool Kit

Figure 2:
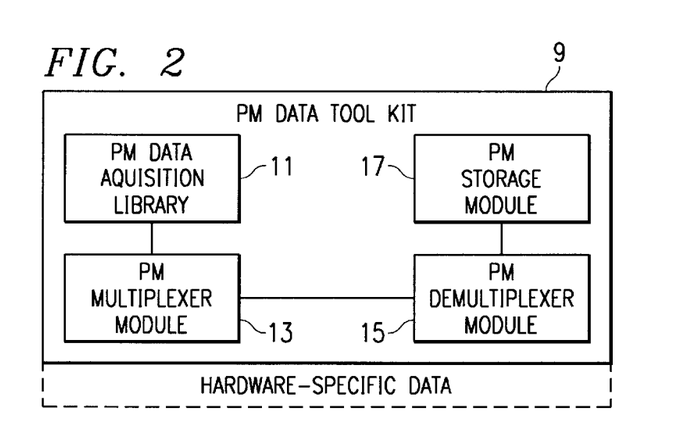
FIG. 2 is a diagram showing components of the PM tool kit according to the present invention.

The reusable PM modules of the present invention provide for an end-to-end sequence of modularity in PM functionality. The present invention is achieved by breaking distinct PM functions out into software modules which can be easily tailored to various telecommunication equipment and providing well-defined interfaces for building the tailored product. The result is a cohesive, flexible tool kit of reusable PM modules which can be combined to easily and inexpensively develop a flexible PM subsystem. Flexibility is achieved by designing the modules so that they are independent of the hardware-specific, application-domain data being generated and collected. The modules of the PM tool kit 9 of the present invention are implemented through using object-oriented software classes as shown in FIG. 2. These classes include the PM data acquisition library 11 (which itself is a library of classes by which PM data is acquired), the PM multiplexer module 13 (which handles the packaging of the acquired PM data), the PM demultiplexer module 15 (which handles the unpackaging of the PM data) and the PM storage module 17 (which handles the I/O operations of PM data). Configuration of a tailored PM system is simpler and less costly due to the modularity of these product-independent (reusable) modules.

PM Data Acquisition Library

The PM data acquisition library 11, according to the present invention, is a library of classes (or modules) which monitor any source of PM data, including PM data received by an AC, a UNIX process or another process. The PM data acquisition library 11 is the mechanism through which PM signals are input. It is the main interface orifice where PM data is acquired for subsequent collection and storage. In an embodiment of the present invention, the PM data acquisition library 11 is located in the AC or in the UC.

The PM data acquisition library 11 includes PM data modules (which are suitable for TMM as well) for performing PM data acquisition (generation and maintenance) functions. These modules are designed with strictly defined interfaces which enable them to be combined to achieve specified PM data acquisition and analysis functions. For example, a gauge PM data module can feed into a minimizing accumulator PM data module, which can feed into an additive accumulator PM data module, etc. A designer can cascade various front ends of PM data modules to other PM data modules using the strictly defined interface configurations.

Strictly defined interfaces are included in the modules of the PM data acquisition library 11 so that interconnection can be made. This is accomplished by calling or event sequences which produce a cascading operation. The well-defined interfaces allow for this mixing and matching behavior. The result is a PM data acquisition library which permits the construction of very complex relationships out of simple software components for any telecommunication equipment (e.g., POTS switch and ATM switch). This type of software system is resilient to minor changes in the telecommunications hardware or software configurations because it is implemented by using plug-compatible, object-oriented classes. Due to their modularity and application-independence, any accumulator or gauge PM data module can also feed into another accumulator or gauge PM data module.

The software of the present invention can be written in C++ language using object-oriented (OO) design techniques. The classes are defined so that they have plug-compatible interfaces. Functions are defined so that they are the same throughout the library and satisfy particular relationships, pass certain parameters and return certain values in a very structured similar manner.

Figure 3:
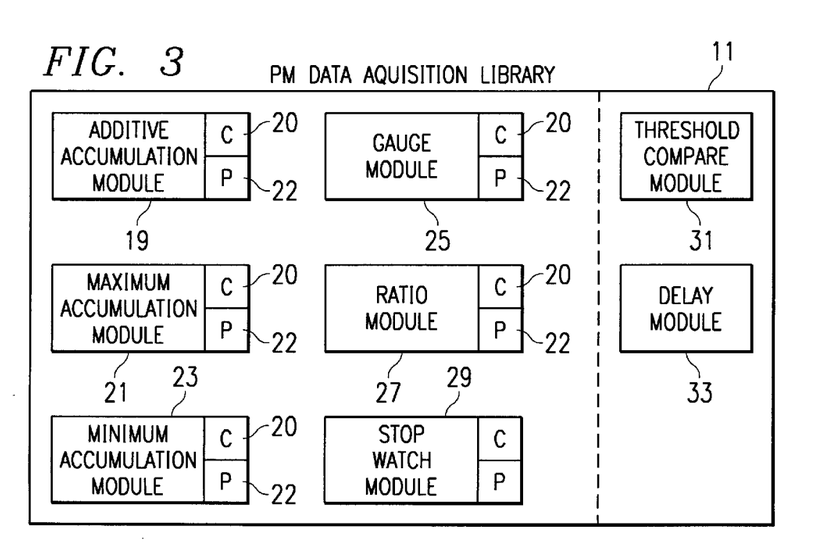
FIG. 3 is a diagram showing components of the PM data acquisition library module of the present invention.

Specifically, by utilizing the natural separation of product-independent classes from product-dependent instances in OO, and applying this theory to PM, the PM data acquisition library 11 is formed. As shown in FIG. 3, six classes of PM data modules are provided in the PM data acquisition library 11 of the present invention, each with a strictly defined plug compatible interface to other object classes. The PM data modules include an additive accumulator PM data module 19, a maximizing accumulator PM data module 21, a minimizing accumulator PM data module 23, a gauge PM data module 25, a ratio PM data module 27 and a stopwatch PM data module 29. In addition, two functional modules are provided to interface with PM data modules. These include the threshold comparator module 31 and the delay module 33. FIGS. 4 to 9 illustrate the functions of each of the PM data classes.

Figure 4:
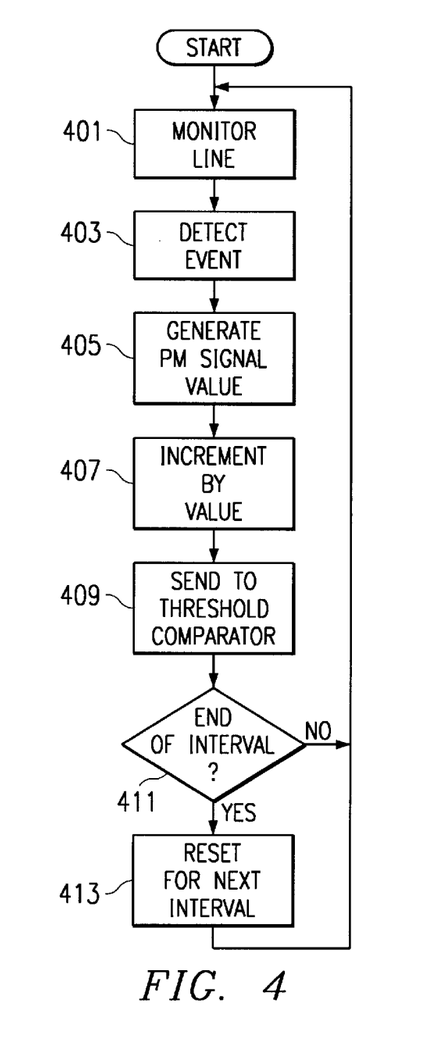
FIG. 4 is a flow diagram of PM data acquisition using the functionality of an additive accumulator PM data module of the PM data acquisition library of FIG. 3, according to an embodiment of the present invention.

FIG. 4 illustrates the functionality of PM data acquisition using an additive accumulator PM data module according to the present invention. At step 401, the incoming traffic on the telecommunication line is monitored. This monitoring can occur every 10 or 50 milliseconds using application software located on the AC 3, or continuously if only hardware is used. During this monitoring, certain microscopic activities are being analyzed. As part of this general surveillance activity, the AC 3 may, in certain situations, take corrective action, in response to certain activities. However, if corrective action is not called for and the activities occur for the time span of a second, the AC 3 may report the second as a severely errored second, thereby creating an event. In response to this event, the AC 3 can generate a PM signal (in the form of a zero, one or multiple bit integer) and forward the signal value to the additive accumulator PM data module 19. Thus, in step 403, an event is detected by the AC 3. In response, a PM signal value is generated and transmitted to the additive accumulator PM data module 19 in step 405. Each PM data module according to the present invention internally maintains two banks of information as shown in FIG. 3. One bank 20 includes data associated with the current monitoring interval and the other bank 22 includes data associated with the previous completed monitoring interval. The reasons for this dual bank design will be described hereinbelow. After the event is generated, assuming the transmission line to be copper wire, the value in the additive accumulator PM data module would be incremented.

In step 407, the additive accumulator PM data module 19 increments the PM data value in its current monitoring interval bank 20 by the PM signal value generated in step 405. Because PM data modules of the present invention support 8, 16 or 32 bit integers, the value may be incremented by a variety of integer amounts. In step 409, the incremented value in the current monitoring interval bank is transmitted to a threshold comparator module 31 shown in FIG. 3, the function of which is described hereinbelow. Next in step 411, the additive accumulator PM data module determines whether the monitoring interval has ended. If the interval has not ended, the AC 3 continues monitoring the line in step 401. If the interval has ended, the additive accumulator PM data module 19 receives a message from a PM multiplexer module 13 (the function of which is described hereinbelow) to swap its banks. As a result, in step 413, the current monitoring interval bank's value is swapped into the previous completed monitoring interval bank 22 and the value in the current monitoring interval bank 20 (from the previous completed monitoring interval bank 22) is reset to zero. The method continues, at step 401, monitoring the line for the next monitoring interval.

Figure 5:
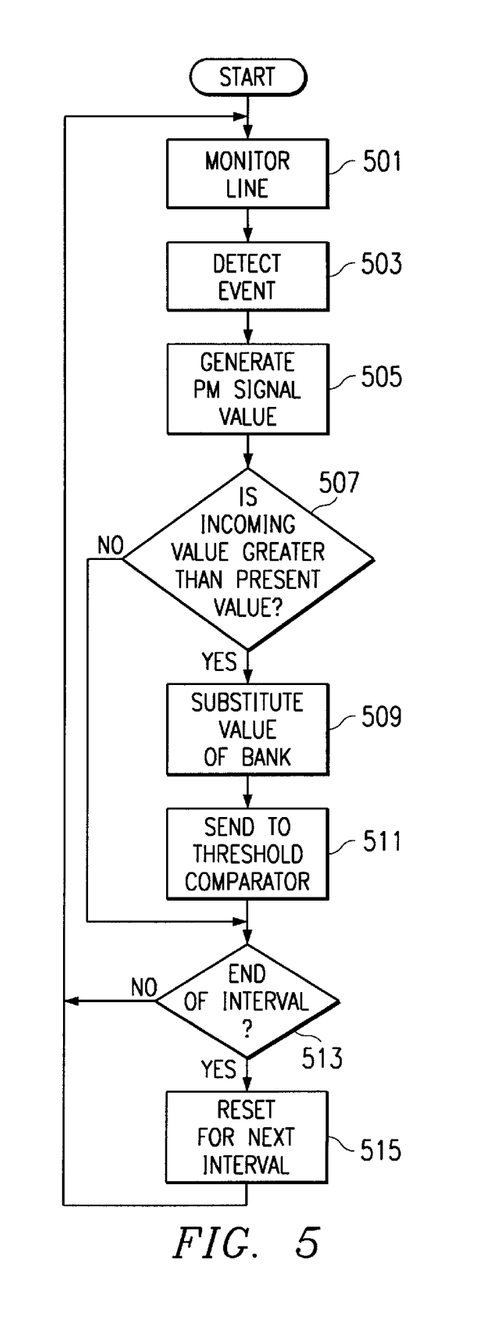
FIG. 5 is a flow diagram of PM data acquisition using the functionality of a maximizing accumulator PM data module of the PM data acquisition library of FIG. 3, according to an embodiment of the present invention.

FIG. 5 illustrates the functionality of PM data acquisition using a maximizing accumulator PM module 21 according to the present invention. At step 501, the incoming traffic is monitored as described hereinabove. At step 503, an event is detected. In response, a PM data signal value is generated and transmitted to the maximizing accumulator PM data module 21 in step 505. In step 507, the maximizing accumulator PM module 21 determines whether the incoming PM signal value generated is greater than the PM data value in its current partial monitoring interval bank 20. If not, the method continues in step 501. If the incoming value is greater than the present value, the method continues in step 509 in which the current monitoring interval bank value is substituted with the incoming value. In step 511, the new value in the current monitoring interval bank 20 in transmitted to a threshold comparator module 31. Next in step 513, the maximizing accumulator PM data module determines whether the monitoring interval has ended. If the interval has not ended, the module continues in step 513. If the Ace interval has ended, the maximizing accumulator PM data module receives a message from a PM multiplexer module 13 to swap its banks, as described hereinabove. As a result, in step 515, the current monitoring interval bank 20 is reset to zero. The method continues in step 501 monitoring the line for the next monitoring interval.

Figure 6:
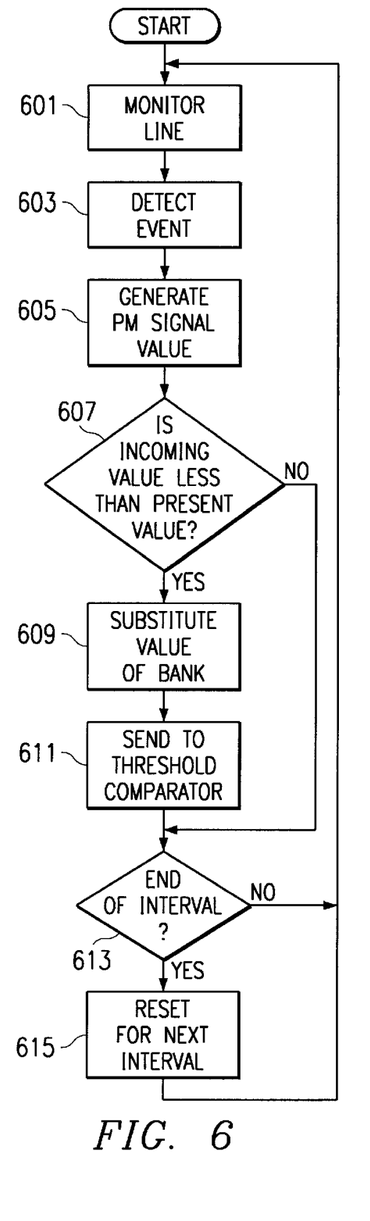
FIG. 6 is a flow diagram of PM data acquisition using the functionality of a minimizing accumulator PM data module of the PM data acquisition library of FIG. 3, according to an embodiment of the present invention.

FIG. 6 illustrates the functionality of PM data acquisition using a minimizing accumulator PM data module 23 according the present invention. In step 601, the incoming traffic on the telecommunication line is monitored. In step 603, an event is detected. In response, a PM signal value is generated and transmitted to the minimizing accumulator PM data module 23 in step 605. In step 607, the minimizing accumulator PM data module 23 determines whether the generated value is less than the PM data value in its current monitoring interval bank 20. If not, the method continues in step 613. If the incoming value is less than the current monitoring interval bank value, the method continues in step 609 in which the current monitoring interval bank value is substituted with the incoming value. In step 611, the new value in the current monitoring interval bank 20 is transmitted to a threshold comparator module 31. Next in step 613, the minimizing accumulator PM data module 23 determines whether the monitoring interval has ended. If the interval has not ended, the module continues monitoring the line in step 601. If the interval has ended, the minimizing accumulator PM data module 23 receives a message from a PM multiplexer module 13 to swap its banks. As a result, in step 615, the current monitoring interval bank value is reset to the default maximum value of the minimizing accumulator. The method continues, at step 601, monitoring the lines for the next monitoring interval.

Figure 7:
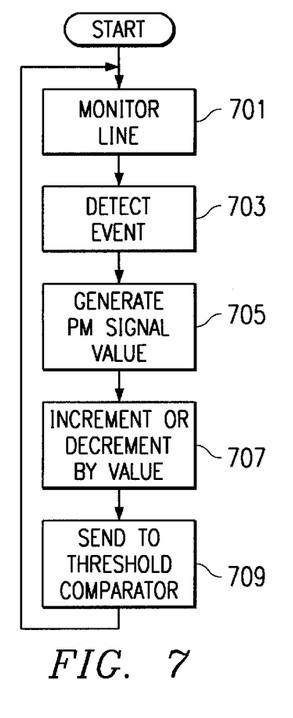
FIG. 7 is a flow diagram of PM data acquisition using the functionality of a gauge PM data module of the PM data acquisition library of FIG. 3, according to an embodiment of the present invention.

FIG. 7 illustrates the functionality of PM data acquisition using a gauge PM data module 25 according to the present invention. At step 701, the incoming traffic on the line is monitored. At step 703, an event is detected. In response, a PM signal value is generated and transmitted to the gauge PM data module 25 in step 705. In step 707, the gauge PM data module 25 either increments or decrements the current monitoring interval bank value by the generated value. In step 709, the incremented or decremented value of the gauge PM data module 25 is transmitted to a threshold comparator 31. Finally, the method continues at step 701 monitoring the line. The value in a gauge PM data module 25 is not reset after each monitor interval.

Figure 8:
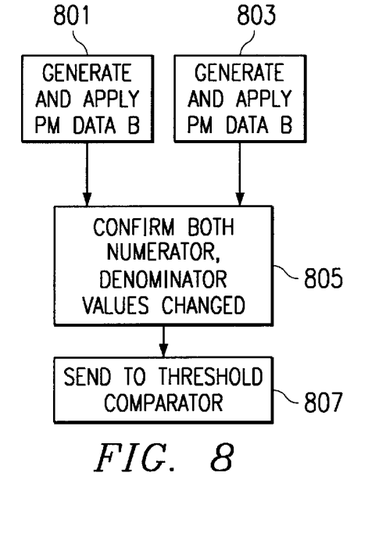
FIG. 8 is a flow diagram of PM data acquisition using the functionality of a ratio PM data module of the PM data acquisition library of FIG. 3, according to an embodiment of the present invention.

FIG. 8 illustrates the functionality of a ratio PM data module 27 according to the present invention. In the PM data acquisition library of the present invention, ratio PM data modules are defined as an independent class. Ratio PM data modules provide for accomplishing fractions or ratios of accumulator or gauge PM data modules. This quantified information is useful, for example, when attempting to measure the percentage of loss of cells in an ATM-based line. At step 801, PM signals are generated and PM data is acquired by an accumulator or gauge PM data module A, as described in FIGS. 4–7. Concurrently or otherwise at step 803, PM signals are generated PM data is acquired by an accumulator or gauge PM data module B, as described in FIGS. 4–7. At step 805, a ratio PM data module 27 receives PM data module A's value and PM data module B's value and confirms that both the numerator and the denominator values have changed. Finally, in step 807 the resulting ratio value is transmitted to a threshold at comparator module 31. Depending on whether PM data modules A and B are accumulators or gauges, the method continues as described in FIGS. 4–7.

Figure 9:
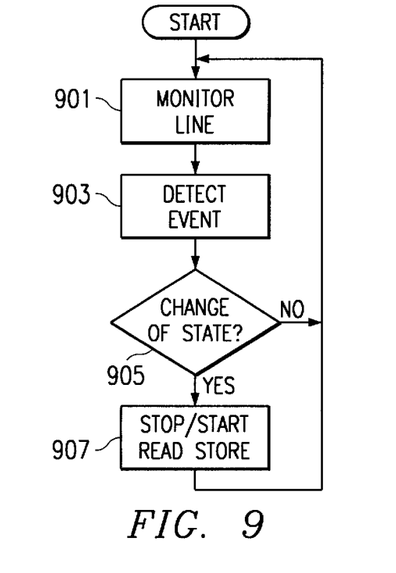
FIG. 9 is a flow diagram of PM data acquisition using the functionality of a stopwatch PM data module of the PM data acquisition library of FIG. 3, according to an embodiment of the present invention.

Finally, the PM data acquisition library of the present invention includes product-independent stopwatch PM data modules 29 which are a class of PM data which measure the amount of time of a particular occurrence. For example, a stopwatch PM data module 29 can measure the time that a particular channel of a transmission line is in use. FIG. 9 illustrates the functionality of a stopwatch PM data module 29. At step 901, the incoming traffic on the line is monitored. The stopwatch PM data module is either in the ON state or the OFF state. At step 903, an event is detected. At step 905, the module determines, upon receiving a signal representative of the event, whether a change of state occurs (e.g., the connection ends). If a change of state has not occurred, the function continues monitoring in step 901. If a change of state has occurred, the function continues in step 907 where the timing stops (or starts) and the timer's value is read or stored. The timer may be reset at this point or simply paused for later restarting. In any case, the function continues monitoring the line in step 901. While not shown, a threshold comparator 31 can be used with a stopwatch PM data module.

Figure 10:
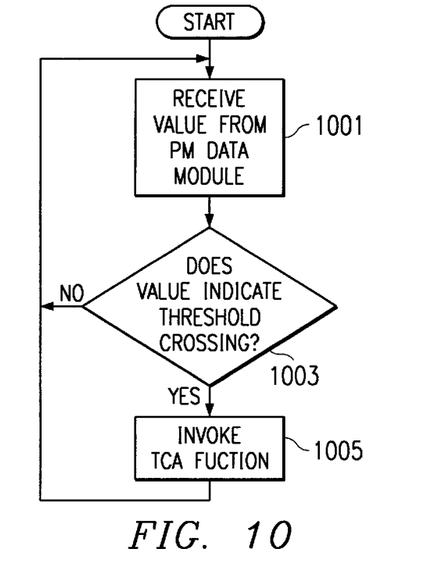
FIG. 10 is a flow diagram of the functionality of a threshold comparator module of the PM data acquisition library of FIG. 3, according to an embodiment of the present invention.

In the present invention, the conventionally bundled threshold comparing function is separated out as a product-independent class known as a threshold comparator module 31. The functionality of the threshold comparator module 31 of the present invention is illustrated in FIG. 10. In step 1001, the threshold comparator module 31 receives a value from a PM data module. In step 1003, the threshold comparator module 31 determines whether the received value indicates that a threshold crossing has occurred.

The threshold comparator modules 31 of the present invention can be increasing or decreasing threshold comparator modules (TCMs). They are capable of having an onset and/or an abatement threshold. Increasing TCMs, in which an onset is entered when the compared value is greater than or equal to the onset threshold, can be associated with a gauge, additive accumulator, maximizing accumulator, ratio or stopwatch PM data module. Decreasing TCMs, in which an onset is entered when the compared value is less than or equal to the onset threshold, can be associated with a gauge, minimizing accumulator or ratio PM data module. Threshold comparator modules 31 for accumulator and stopwatch PM data modules have only onset thresholds since they vary unidirectionally. Threshold comparator modules 31 for gauge PM data modules 25 have both onset and abatement thresholds since they vary bidirectionally. Threshold comparator modules 31 for ratio PM data modules can have onset and/or abatement thresholds since they can interface with accumulator or gauge PM data modules. TCMs for ratio PM data modules actually incorporate a division function so that the determination of step 1003 can be made.

If a determination is made that a threshold crossing has not occurred the method continues in step 1001. However, if the received value is indicative of threshold crossing, the method continues in step 1005 in which the threshold comparator module 31 invokes a threshold crossing alert (TCA) function in a threshold crossing alert module. The TCA function forwards a message to an off-switch operator so that real-time responsive activity can be taken, if necessary. In addition to involving the TCA function, the threshold comparator module 31 also returns a message to the PM data module so that the threshold crossing state information can be stored in the current monitoring interval bank. Thereafter, the method continues in step 1001.

There are strictly defined interfaces to the threshold comparator modules 31 of the present invention. A PM data module can have zero or more threshold comparator modules 31 associated with it, each threshold comparator module 31 representing a binary state. For example, an additive accumulator PM data module 19 can feed into three different threshold comparator modules 31 so that one represents a minor problem, the next represents a major problem and the last represents a critical problem. Once the value of an accumulator reaches a threshold, the corresponding threshold comparator module 31 enters the ON state and, until the next monitoring interval and the accumulator's value is reset, the threshold comparator module's function is complete. Gauge PM data modules 25, however, are not reset at each monitoring interval and because they vary bidirectionally, their corresponding threshold comparator modules 31 may change state multiple times. However, to provide hysteresis, the onset and abatement threshold of a gauge PM data module's threshold comparator module are set apart from one another. This spacing between onset and abatement thresholds is also set to minimize the number of times a threshold comparator module 31 changes states.

Delay Module

To satisfy the SONET standard for optionally discarding the last ten seconds of PM data, the PM data acquisition library 11 incorporates a class known as a delay module 33. This delay module 33 provides a ten second delay for the purposes of satisfying the present standard. However, a person skilled in the art would understand that the length of the delay could be adjusted in other embodiments (e.g., if the standards dictate a change). The delay module 33 is a front end to any accumulator PM data module used to acquire PM data from a SONET fiberoptic line. It functions as a conveyor belt or queue for digital (binary) values. Values can be discarded from the queue or they can be applied to the accumulator PM data module. The front end of the delay queue is where incoming PM signals generated from detected events are directed. Thus, for an additive accumulator PM data module 19, an incoming PM signal represented by a "one" will not increment the accumulator PM data module until it passes successfully through the delay queue of the delay module and is transmitted to the accumulator PM data module. This accomplishes the state machine-based higher level of standard implementation without requiring an "undo" operation and in a manner more efficient and more flexible than conventional methods.

The ten-second delay is implemented in software in the PM data acquisition library 11. The values applied to the front of a delay module 33 can be single bit zeroes or ones which simply increment an additive accumulator PM data module 19 or 8, 16 or 32 bit integer values which add whole numbers an additive accumulator PM data module 19. Therefore, for single bit values, the delay module is incremented as bits using a shift operator to shift bits up or down. For the integer values, a small array of integers is maintained on the delay module. The bit-oriented method is faster and utilizes less RAM space and CPU resource.

Figure 11A:
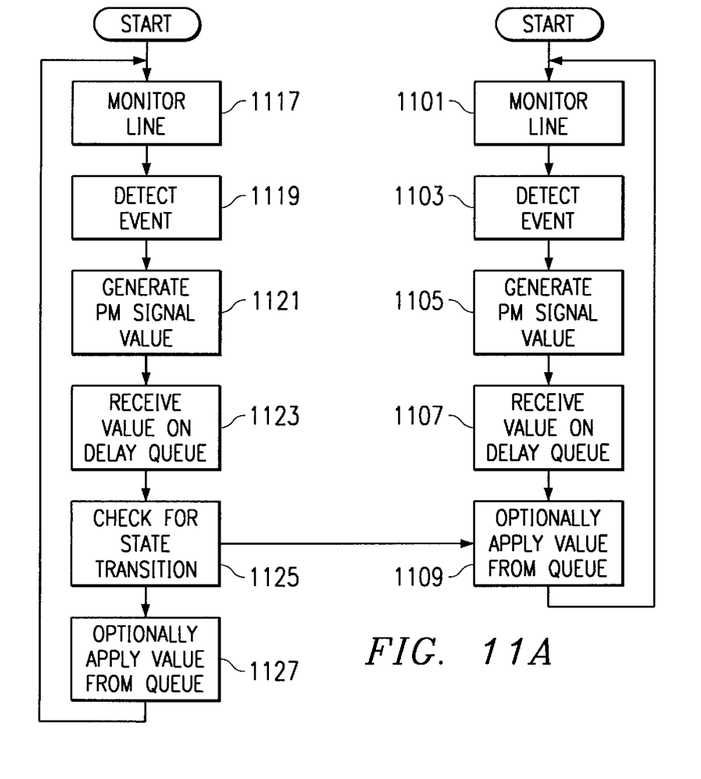
FIGS. 11A, 11B, and 11C are flow diagrams of the functionality of delay modules of the PM data acquisition library of FIG. 3, according to an embodiment of the present invention.
Figures 11B, 11C, 12:
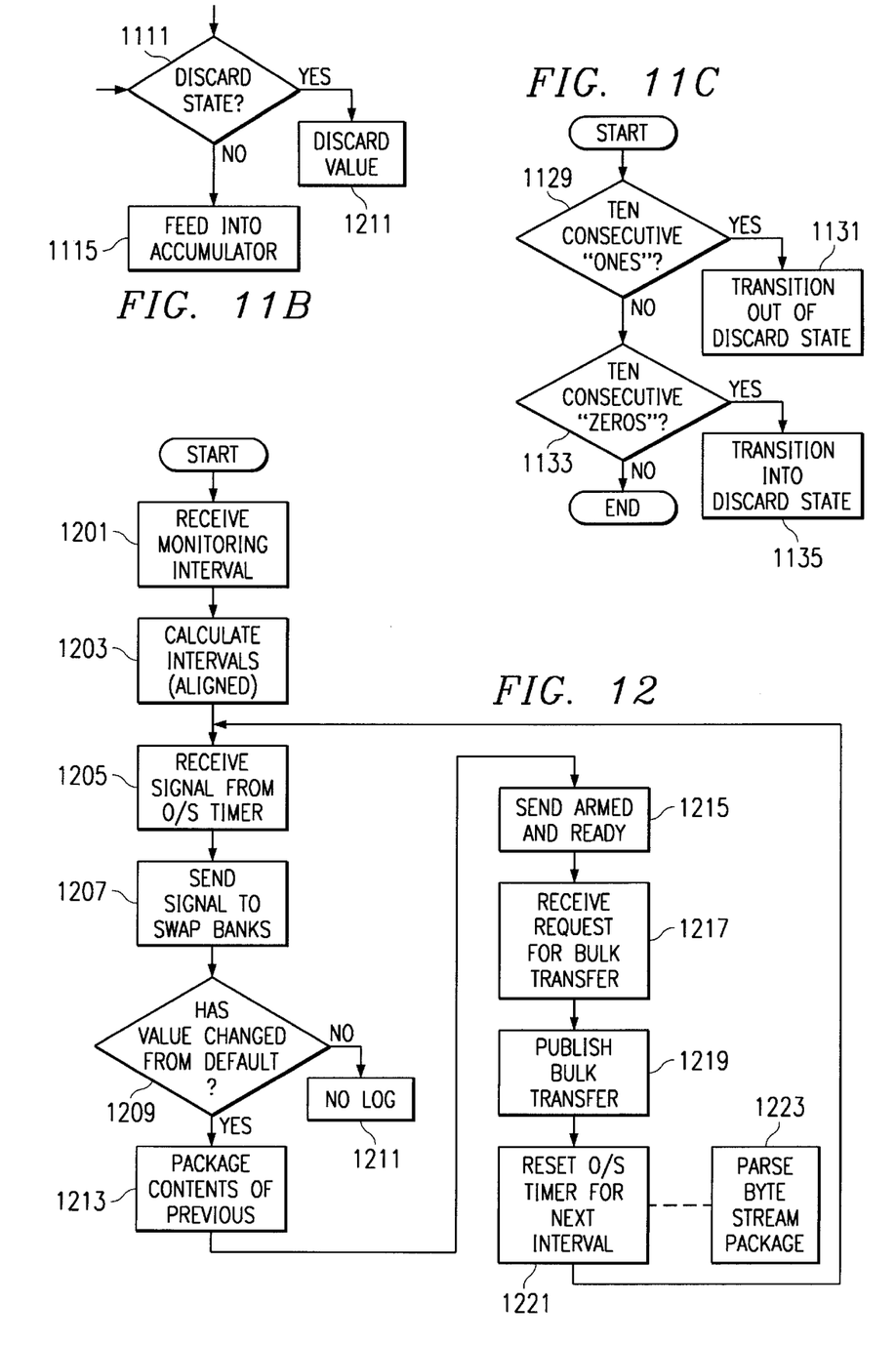
FIG. 12 is a flow diagram of the functionality of the PM multiplexer module according to an embodiment of the present invention.

FIGS. 11A, 11B and 11C illustrate the method of the delay module 33 with a SONET accumulator according to the present invention. Assuming a fiberoptic (SONET) line, the ten-second delay of the present invention is utilized. At step 1101 of FIG. 11A, the incoming traffic on the telecommunication line is monitored by, e.g., an AC 3. At step 1103, the AC detects that an event occurred and, in response, generates a PM signal at step 1105. The PM signal value generated is received on the ten-second delay queue of the delay module 33 at step 1107. Up until the value is applied to the accumulator PM data module to be incremented, maximized or minimized, the system is said to be in the acquisition stage. During this stage, the system determines whether to apply the outbound value (or all the values) on the queue to the accumulator PM data module at step 1109. This determination is made based on a two-state machine as illustrated in FIG. 11B. If, in step 1111, the state machine is determined to be in the discard state, either the outbound value is discarded or, in another embodiment, all of the values on the queue are discarded in step 1113. If the state machine is determined not to be in the discard state, the value is fed into the accumulator PM data module in step 1115.

The state transition of the (slave) delay module is governed by a separate controlling or master delay module which front ends an additive accumulator PM data module 19. Just as the hereinabove-discussed PM signals are generated in response to detection of an event while monitoring the transmission line, another parallel monitoring of the line is being executed in step 1117 for other (possibly product-specific) PM data. In the same manner as discussed above, when an event is detected in step 1119, a PM signal is generated in step 1121. Next in step 1123, the value is received on a delay queue known as a master delay module. At step 1125, the system checks to see if the master delay's state machine is in the discard state or is transitioning to the discard state according to its own state machine.

The state machine for the master delay module is illustrated in FIG. 11C. The master delay module checks to see if 10 consecutive zeros were received by the master delay queue in step 1129. When 10 consecutive one's or zero's are placed on the queue, a state transition may occur depending upon the current state. For instance, if the state machine is in the zero (i.e., discard) state, then ten consecutive ones will bring about a state transition out of the discard state, as in step 1131. In contrast, ten consecutive zeroes will not bring about a change of state and the method continues in step 1133. The delay module would remain in the discard state. If the state machine is in the one (i.e., non-discard) state, ten consecutive zeroes will bring about a state transition into the discard state, as in step 1135.

If the master delay module's state machine is in the discard state, the master delay module transmits a signal to the slave delay module instructing it to transition to the discard state and the outbound values (or all the values) of the two delay queues are discarded in steps 1127 and 1109. If not, the slave delay module (in the non-discard state) feeds this outbound value into the accumulator in step 1109, completing PM data acquisition and the master delay module applies another "one" to its additive accumulator in step 1127. Because of the modularity of the present invention, the accumulator PM data modules which back end these delay modules can feed into other accumulator or gauge PM data modules, etc.

PM Multiplexer Module

The present invention provides a PM multiplexer module 13 which handles the PM data packaging and a PM demultiplexer module 15 which handles PM data unpackaging. These application-independent sibling modules together efficiently utilize the resources of the telecommunications equipment in a highly flexible manner. The functionality of the system PM multiplexer module 13 is illustrated in FIG. 12. An operator must input the monitoring interval length so that the PM multiplexer module 13 receives the information in step 1201. In response, the PM multiplexer module 13 automatically calculates a wall clock aligned set of monitoring intervals (i.e., 15 minutes on the hour or quarter-hour for PM data and 30 minutes on the hour or half-hour for TMM data) in step 1203. In step 1205, the PM multiplexer module 13 receives a signal from a local operating system timer demarcating a monitoring interval (indicating that the interval has ended). In response, the PM multiplexer module 13 transmits a signal to each PM data module in a source of PM data, instructing each to swap its banks in step 1207. As discussed hereinabove, each PM data module, according to the present invention, maintains two banks of information. One bank 20 is active and includes data associated with the current partial monitoring interval. The other bank 22 is inactive and includes data associated with the previous completed monitoring interval. Both banks contain the current PM data value and state information relating to threshold crossings. In step 1209, after the swapping is completed in accumulator, stopwatch and ratio (of accumulators) PM data modules, the data now in the previous completed monitoring interval bank 22 (which was in the current partial interval bank 20 before the swap) is compared to the default value for the particular PM data module and the current partial monitoring interval bank 20 is reinitialized. In gauge PM data modules, either the data in the previous completed monitoring interval value is copied back into the current partial monitoring interval bank after swapping or, rather than performing a swap, the data in the current partial interval bank 20 simply is loaded into the previous completed interval bank. In either embodiment, the current monitoring interval bank retains its value and is not reinitialized. Therefore, there is no comparison for gauge or ratio (of gauges) PM data modules.

Assuming other than a gauge or ratio (of gauges) PM data module, if in step 1209, the value of that PM data module did not change from its default value during that just-completed monitoring interval, the system will not record the information for that PM data module, as shown in step 1211. This "default value suppression" is dictated by telecommunications standards and takes into consideration the reality that, most of the time, the network is free of defects or anomalies. Thus, the system is not burdened by the transmission of a large number of default values (e.g. zeros). If the value has changed from the default value, the system pulls the value from each PM data module's previous completed monitoring interval bank 22 and packages the information from all PM data modules into a single dense byte stream in step 1213. The system is flexible enough to accommodate multiple mixed integer sizes supported by the PM data modules and different categories of PM data. Once the packaging is completed, an armed and ready message is transmitted to the destination of the PM data (e.g., UC 5) as shown in step 1215.

The armed and ready message can be sent immediately after the bank swapping is completed so that the packaging is delayed until after a request for bulk transfer is received from the controller. While this method may consume less RAM, it is more difficult to implement. The armed and ready message indicates that the data is ready to be requested for a specific monitoring interval.

After a request for bulk transfer is received for that particular monitoring interval, in step 1217, assuming the packaging has already completed in step 1213, the PM multiplexer module 13 publishes the bulk transfer or transmits the contents of the bulk transfer to the controller in step 1219. In accordance with the present invention, the bulk transfer contents include the byte stream of PM data and on/off data indicating whether default value suppression occurred. Finally, the system resets the operating system timer for the next monitoring interval instep 1221.

The PM demultiplexer module 15 of the present invention is used to parse or decompose the format of the packaged byte stream of the bulk transfer back into its component PM data format for the particular source of component PM data for use by the controller in step 1223. As opposed to the PM multiplexer module 13 which is normally resident in the source of PM data (e.g., AC), this PM demultiplexer module 15 is normally resident at the UC or SM level. Its ability to unpackage the byte system and recreate the PM data generated in the PM data acquisition library makes possible the storage of the data (discussed hereinbelow).

Regulated Push Collection Method

Figure 13:
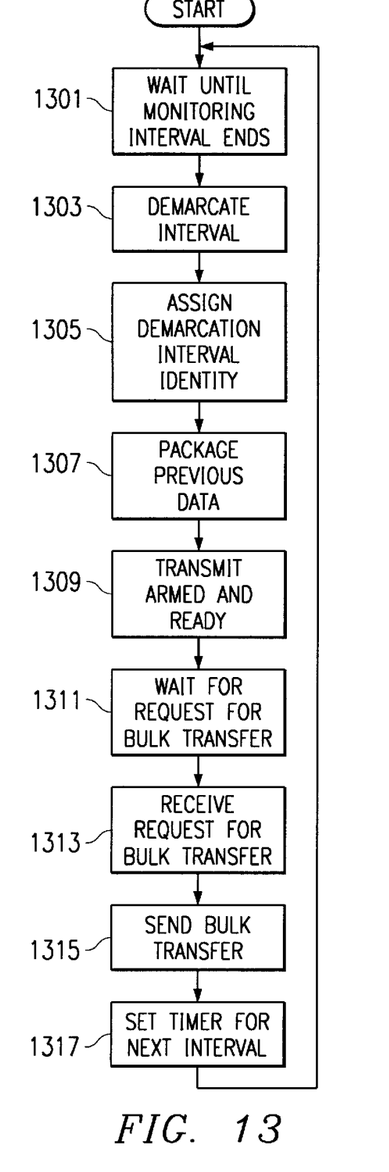
FIG. 13 is a flow diagram of the regulated push method of PM data collection at the AC level according to an embodiment of the present invention.

The present invention also provides a method of collecting PM data which does not suffer from poor PM performance nor harms the overall performance of the telecommunications system. FIG. 13 illustrates the functionality of the regulated push at the source of PM data (AC) level, according to an embodiment of the present invention. In step 1301, all the ACs wait until the current monitoring interval ends. When the interval ends, all of the ACs demarcate the interval through the local PM multiplexer module 13 (described hereinabove) using synchronized clocks with subsecond tolerances, in step 1303. Next, in step 1305, an identity is assigned to the monitoring interval (e.g., 1:30 PM monitoring interval). Once the identity is assigned, the data in the previous completed monitoring interval bank from each PM data module is packaged into a byte stream, as described hereinabove, in step 1307. In step 1309, an armed and ready message is transmitted to the controller or process indicating that the AC will wait for a request for bulk transfer of the PM data contents, as shown in step 1311. The ACs will wait up until the monitoring interval ends. If a request for bulk transfer is not received within this time period, the data is overwritten and lost. The armed and ready messages, unlike the flood of synchronized data transmitted to the controller in the push method, are relatively small messages of up to several dozen bytes. Furthermore, these armed and ready messages are not necessarily transmitted concurrently. Therefore, there is no problem of flooding in the present regulated push method. In step 1313, the request for bulk transfer is received within the allowable period. In response to the request, a single bulk transfer is transmitted to the controller in step 1315. Finally, in step 1317, the system timer is reset for the next monitoring interval.

On the controller side, the UC waits for armed and ready messages. Upon receiving such a message, the UC posts the message to an armed and ready queue. Therefore, the notifications of readiness from the ACs are received in a manner that does not flood the system and the notifications are placed on a queue so that the UC can react to the notifications by requesting one or more bulk transfers at a time, when appropriate. Hence, the push is regulated.

Figure 14:
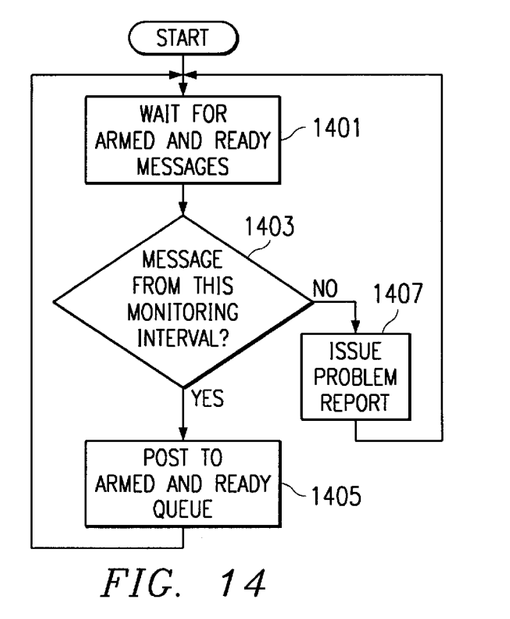
FIG. 14 is a flow diagram of an execution thread of the regulated push method of PM data collection at the controller (UC or SM) level according to an embodiment of the present invention.
Figure 15:
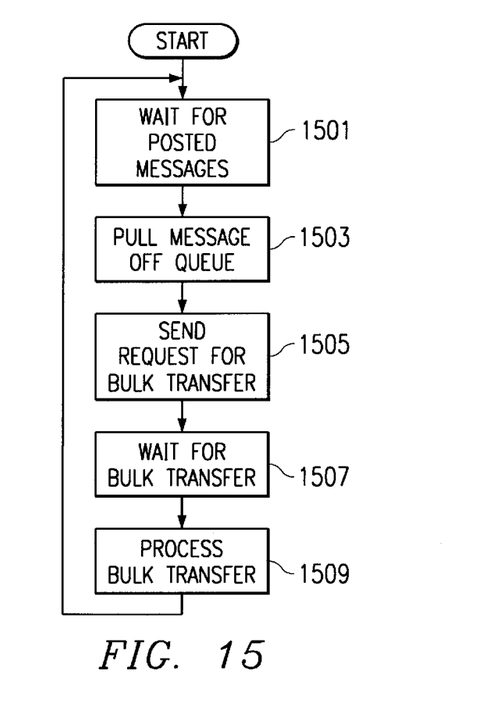
FIG. 15 is a flow diagram of another execution thread or threads of the regulated push method of PM data collection at the controller (UC or SM) level according to an embodiment of the present invention.
Figure 16:
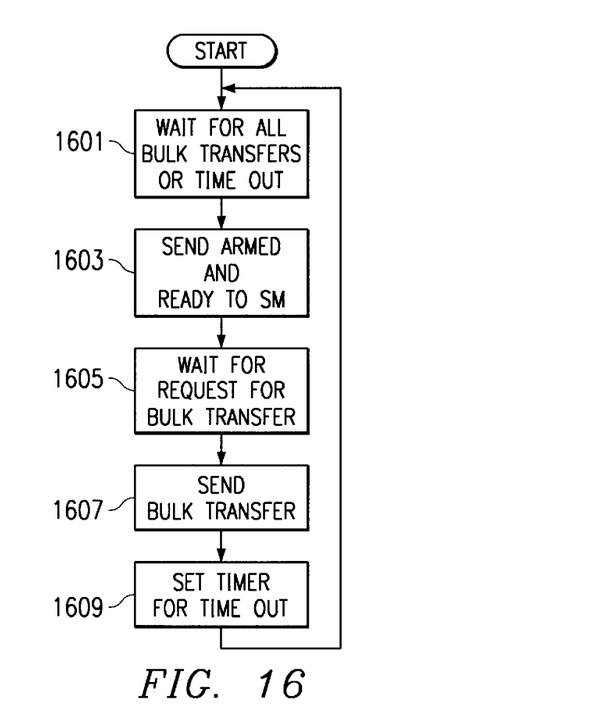
FIG. 16 is a flow diagram of another execution thread of the regulated push method of PM data collection at the controller (UC or SM) level according to an embodiment of the present invention.

To illustrate, at the UC level, there are multiple threads executing the functionality represented in FIGS. 14 to 16. In FIG. 14, a single thread of the UC waits, in step 1401, for armed and ready messages to be received from the ACs. Each message, as it is received, is inspected, in step 1403, to confirm that its identity matches the monitoring interval that is currently being handled. If the identity is consistent with the current monitoring interval, the message is posted to an armed and ready queue in step 1405 and the method continues in step 1401. However, if the message is determined to be from a monitoring interval other than the one being handled, an issue problem report is generated in step 1407 and the method continues in step 1401.

FIG. 15 illustrates another functionality which can be implemented simultaneously by a variable K threads within the UC. The variable K represents the number of concurrent bulk transfers that are to be transmitted in the PM system. It is a tunable parameter which directly affects the bandwidth consumed by the system. Each of these K threads begins in step 1501 by waiting for a message to be posted to the armed and ready queue in step 1405 of FIG. 14. When a message is posted to the queue, the system pulls the message off the queue in step 1503. In response, a request for bulk transfer is transmitted to the AC in step 1505. In step 1507, the UC waits for the bulk transfer to be received. The UC waits for a maximum amount of time after which a timeout occurs and the message is returned to the back end of the armed and ready queue. Assuming a completed bulk transfer, the UC next processes the bulk transfer in step 1509 by posting it to a bulk transfer queue.

FIG. 16 illustrates another separate thread of the UC in accordance with an embodiment of the present invention. In step 1601, the UC waits for all the requested bulk transfers to be posted to the bulk transfer queue. As a bulk transfer is posted, the UC thread "wakes up," pulls the bulk transfer off the queue, identifies the bulk transfer and temporarily stores it. The thread waits for a maximum amount of time. If, during this waiting time, all of the requested bulk transfers are received and properly identified, the method continues in step 1603. If the maximum time expires without receipt of all the bulk transfers, a timeout condition occurs and the method continues in step 1603, leaving behind the late bulk transfers to be handled at a later time on an expedited special case basis. In step 1603, an armed and ready message is sent to the SM. Next, the UC waits for a request for bulk transfer (again for a maximum amount of time), in step 1605. When a request is received, the bulk transfer is sent to the SM in step 1607. Finally in step 1609, the timeout timer is recalculated, based on the time elapsed in executing the thread's function, for the next set of bulk transfers.

At the SM level, there are threads executing similar to those in FIGS. 14 and 15. However, in step 1509 of FIG. 15, the bulk transfer is processed by the SM's transmitting it to the PM demultiplexer module 15, described hereinabove, for unpackaging and storage by the PM storage module 17, described hereinbelow.

PM Storage Module

The present invention provides a PM I/O system that is application independent and performs high-speed cached tabular disk I/O tailored to performance monitoring. The tables in the present invention are organized based on the telecommunication configuration provided. Therefore, they do not require dynamic sizing. Because there are only a certain number of UCs and ACs in a particular configuration, a designer can predict the storage needs of a system. For each PM data aggregate type (e.g., DS1 path, DS3 section, OC3 line), a table of logical disk blocks is assigned. Thus, the number of tables is fixed based on the total number of data aggregate types interfacing with a system configuration. Because the size of PM data aggregate types are fixed by standards, the size of the rows within each table are correspondingly fixed. Given the configuration, the length of the table (number of rows) is also fixed (e.g., SM has 2 UCs, each composed of 6 ACs corresponding to a certain number of PM data aggregate instances in each table).

A logical disk block is composed of multiple physical disk blocks. The operating system for a given file system will retrieve (or write) at least one logical disk block (minimum unit of disk I/O) from disk during a read (or write). While logical disk blocks are stored as contiguous physical disk blocks, multiple logical disk blocks in a file may be positioned in many locations on disk, increasing access time for that file. For example, if one row of a table spans two disk blocks, a high cost is paid in access time for a few bytes.

Therefore, access speed can be improved if an application's disk I/O accesses logical disk blocks in a manner which is "conscious" of the boundaries between logical disk blocks and which rows are stored on which disk blocks. While conventional general purpose file systems and general purpose database management systems do not permit I/O of individual disk blocks, in the present invention, this I/O functionality is fully presented to the PM application by the PM storage module 17 through an interface. This is accomplished because no individual row spans the boundary of a logical disk block. Each row is contained within exactly one logical disk block. Therefore, the access cost of the disk I/O is kept low.

According to the present invention, the application requests its rows. Those logical disk blocks corresponding to the rows are mapped into RAM by the PM storage module 17. According to an aspect of the present invention, the rows are explicitly locked by the PM storage module 17 application so that the logical disk blocks are locked.

There are two aspects to the novel locking mechanism of the present application. First, an application is guaranteed that its requested data is resident in RAM during the locking period. Second, while it is locked, the row of data may be read by multiple threads, but written by only one thread. When a thread is writing, no other threads may be reading.

At the point of lock, the PM storage module 17 investigates the cache (RAM representations of logical data blocks on the disk). If the disk block (row) is in the cache, the PM storage module 17 applies the lock and the operation proceeds. If the row is not in the cache, the PM storage module 17 performs disk I/O to retrieve the logical disk block into the cache so that the lock can be applied.

When the lock is lifted, the logical disk block is flushed to the disk. If this flushing is unsuccessful, the disk block is inspected, upon being removed from the cache, to determine whether it was previously flushed. If it wasn't flushed earlier, it is written to disk at this point.

This checking for flushing could occur more often (e.g., once every minute) between the point of locking and the point of removing.

Figure 17:
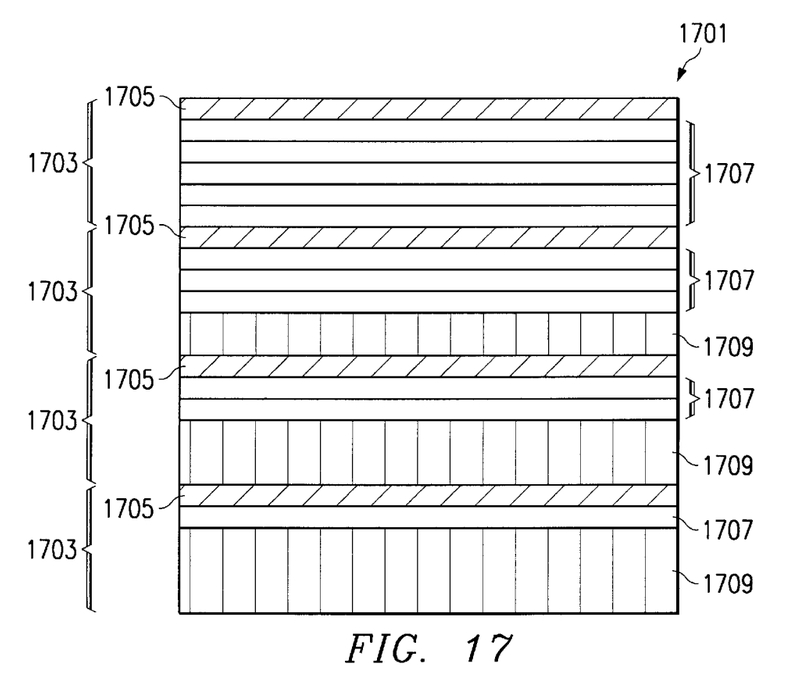
FIG. 17 is a memory map for storage of PM data within the PM storage module according to an embodiment of the present invention.
Figure 18A:
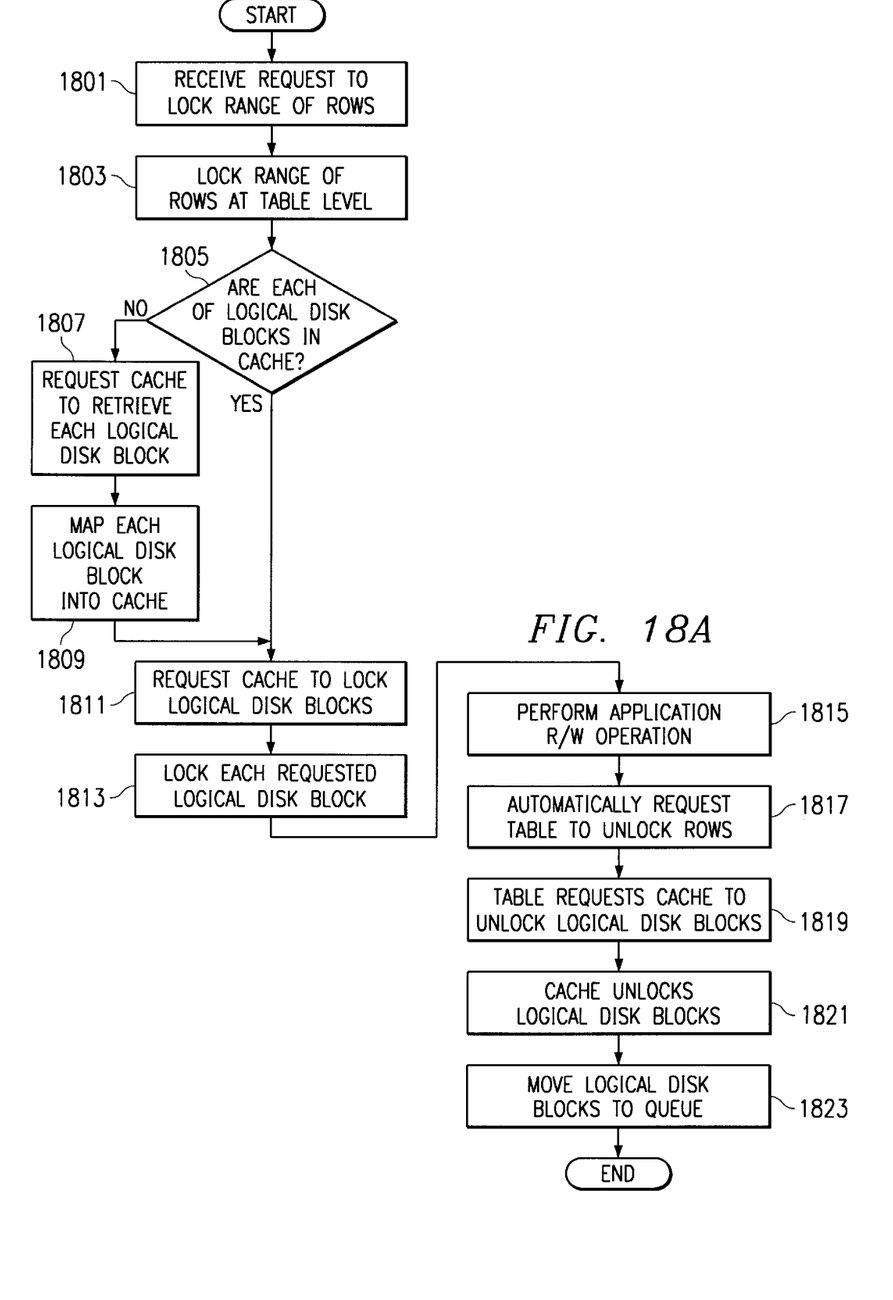
FIGS. 18A, 18B and 18C are flow diagrams of the functionality of the PM storage module according to an embodiment of the present invention.
Figure 18B:
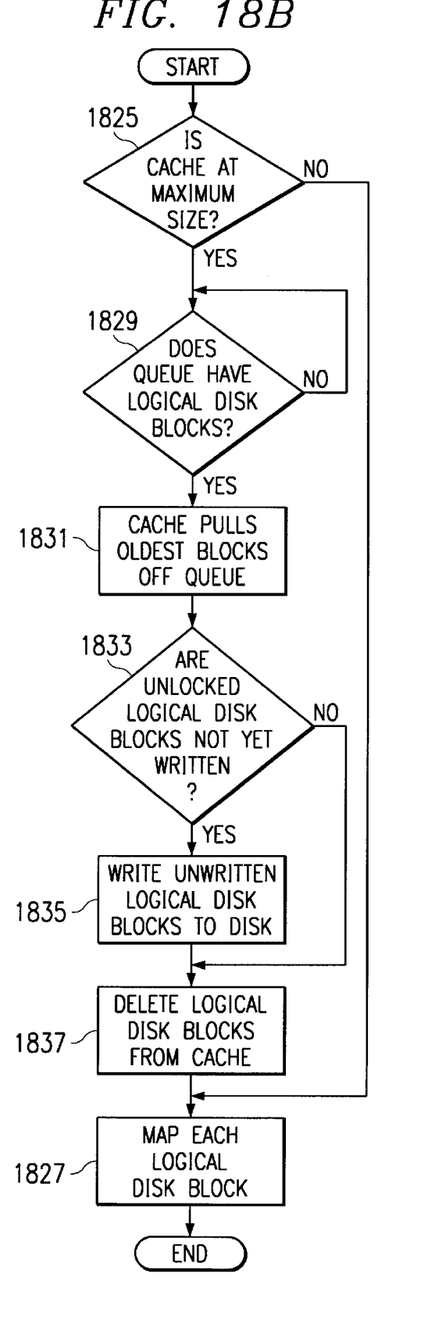
Figure 18C:
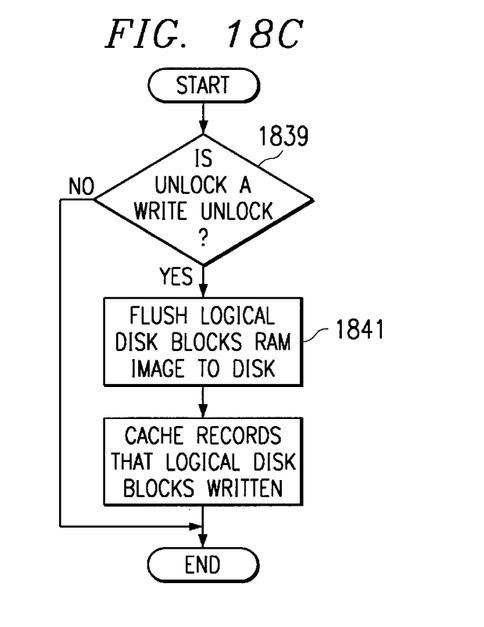

This functionality is illustrated in FIGS. 17 and 18. In the present invention, a table, as shown in FIG. 17, corresponds to data on disk as well as its RAM image. Each table 1701 is composed of one or more logical disk blocks 1703. In an embodiment of the PM storage module 17, each table 1701 is represented in software by a table object. Each logical disk block 1703 within the table 1701 has header information 1705 and one or more rows 1707. The header information optionally can provide indexing and searching capability. Upon each PM Demultiplexer modules's completion of its function, the application software receives the data and stores it using the PM storage module's tabular format. Thus, each row 1707 in the table 1701 has a fixed number of bytes in a fixed format and directly corresponds to a C or C++ structure (which is typically one or more multiples of four bytes) so that an application can interface with disk directly in its native format. Therefore, unlike conventional database management systems, there is no translation required between the compiler's definitions, formats and rules and those of the disk. These structures are placed in predefined locations in a RAM image of logical disk blocks represented by the tables 1701. A given table is made up of data collected from monitoring a particular data aggregate type. The data in the rows if each logical disk block corresponds to particular instances of data aggregate types (e.g., DS1 path on AC1 of shelf 1) for a particular monitoring interval. Therefore, because there is a fixed number of shelves, a fixed number of ACs on each shelf and a fixed number of monitoring intervals in a day, the data locations in the tables of the present invention are predefined or precomputed. For example, if gauge PM data from a DS1 line of AC1 within UC1 from the 1:30 PM monitoring interval is demultiplexed, the data is stored in one particular predefined location in RAM and on disk. Each disk block does not make use of a portion 1709 of its space at the end of the disk block so that the rows do not span logical disk blocks and so that a disk block can be read with the understanding of exactly where a row begins.

FIGS. 18A, 18B and 18C illustrate the method of disk I/O performed by the present invention. In step 1801, an application on the SM level determines the range of rows from a given table on which to perform a read or write application and sends a message to the PM storage module 17 requesting a locking of the determined rows. In step 1803, the PM storage module 17 locks that range of rows for reading or writing at the table level such that logical disk block boundaries are ignored. Putting in place this interthread locking mechanism prevents the disk blocks corresponding to those rows from being flushed to disk. Next, in step 1805, if it is determined that each of the logical disk blocks which encompass the range of rows that were locked are not in the PM storage module's cache, then the table object within the PM storage module 17 transmits a message to the cache requesting retrieval of each of those logical disk blocks from disk in step 1807. In step 1809, each of those logical disk blocks are mapped into the RAM-based cache as images of logical disk blocks. In the present invention, logical disk blocks are mapped into RAM through memory mapped disk blocks as are used in virtual memory. Using the same techniques as those used by an operating system to implement virtual memory mapping, but in the context of saving PM data to disk, the PM storage module eliminates the need for translation of data between RAM and disk. Therefore, the system according to the present invention has less overhead and, thus, is more flexible and efficient than other systems. Next, or if each of the logical disk blocks were found to be in cache in step 1805, the table object sends a message to the cache requesting a read or write lock of those logical disk blocks, in step 1811. In response, the cache, in step 1813, locks each requested logical disk block for the read or write. During this locked period, the controller performs its application domain read or write operations on the range of rows in step 1815. When the operations are completed, the SM automatically sends a message to the table object of the PM storage module 17 requesting that the logical disk blocks be unlocked, in step 1817. In step 1819, the table object sends a message to the cache requesting the unlocking. In response, in step 1821, the logical disk blocks are unlocked by the cache. The lock, according to the present invention, is implemented by declaring a lock variable in a compound statement within the C++ language. This lock variable is for all of the PM storage module locks. Therefore, upon leaving the compound statement (after the read/write operations are completed), the logical disk blocks are unlocked automatically as a byproduct of the C++ language's clean-up and deallocation activities which occur at the end of a compound statement. No initiation of a separate instruction is required so as to limit errors. In step 1823, the unlocked logical disk blocks are moved to a queue which maintains the disk blocks based on a least-recently-used algorithm. The least-recently-used (oldest) blocks are later removed from cache when more space is required in RAM.

Step 1809 is further detailed in FIG. 18B. If the cache is not determined, in step 1825, to be at its maximum size, where size is equated to a number of logical disk blocks, the requested disk blocks are mapped to RAM in step 1827. If the cache is determined to be at its maximum size in step 1825, then the least-recently-used queue is checked, in step 1829, to determine whether the number of logical disk blocks requested is less than or equal to the number of logical disk blocks in the queue. If not, the system pends on the queue until the condition is met. Once the condition is met in step 1829, the cache pulls the least-recently-used (oldest) disk blocks off the queue according to the least-recently-used algorithm, in step 1831. Next in step 1833, the system checks the unlocked logical disk blocks to determine if they have not yet been written (flushed) to disk. If they are determined to be not yet written, they are flushed to disk at that point at step 1835. Once they have been written or if they were found to have been previously written, the logical disk blocks are deleted from the cache in step 1837. Finally, the requested logical disk blocks are mapped to RAM in step 1827.

Step 1821 is detailed in FIG. 18C. First, the system determines whether the unlock is a write unlock in step 1839. If it is a read unlock rather than a write unlock, the method from FIG. 18A continues to step 1823. If the unlock is determined to be a write unlock, the system attempts to flush the logical disk blocks' RAM image to disk at step 1841. Finally, if the flush was successful, the cache records that the logical disk blocks have been written in step 1843.

Although the present invention has been described in detail, it should be understood that various changes, substitutions and alterations can be made hereto without departing from the spirit and scope of the invention as defined by the appended claims.

What is claimed is:

1. A method for processing PM signals to be applied to an accumulator PM data module for further analysis comprising:

monitoring first and second transmission line channels to detect events;

generating first and second PM signals in response to the events;

receiving the first and second PM signals in first and second delay modules, the first and second delay modules having first and second module values therein; and applying, in accordance with a discard state and responsive to the second PM signal, the first module values to the accumulator PM data module so as to acquire PM data for collection, storage and analysis.

2. The method of claim 1 wherein the receiving step comprises providing the first and second PM signals representative of first and second PM signal values to a first and second delay module queue.

3. The method of claim 2 wherein the optionally applying step comprises:

determining a state of the second delay module queue after the second PM signal value is received; and applying the first module values to the accumulator PM data module, responsive to the second delay module queue state.

4. The method of claim 3 wherein the determining step comprises checking whether the second module values include consecutive "ones" or "zeroes."

5. The method of claim 4 further comprising the step of transitioning the second delay queue out of the discard state when the second module values include consecutive "ones."

6. The method of claim 4 further comprising the step of transitioning the second delay queue into the discard state when the second module values include consecutive "zeroes."

7. The method of claim 1 wherein the second delay module is a controlling delay module and the first delay module is a controlled delay module.

* * * * *